F. H. WILLIS.
VALVE.
APPLICATION FILED JUNE 28, 1920.
1,377,240.
Patented May 10, 1921.
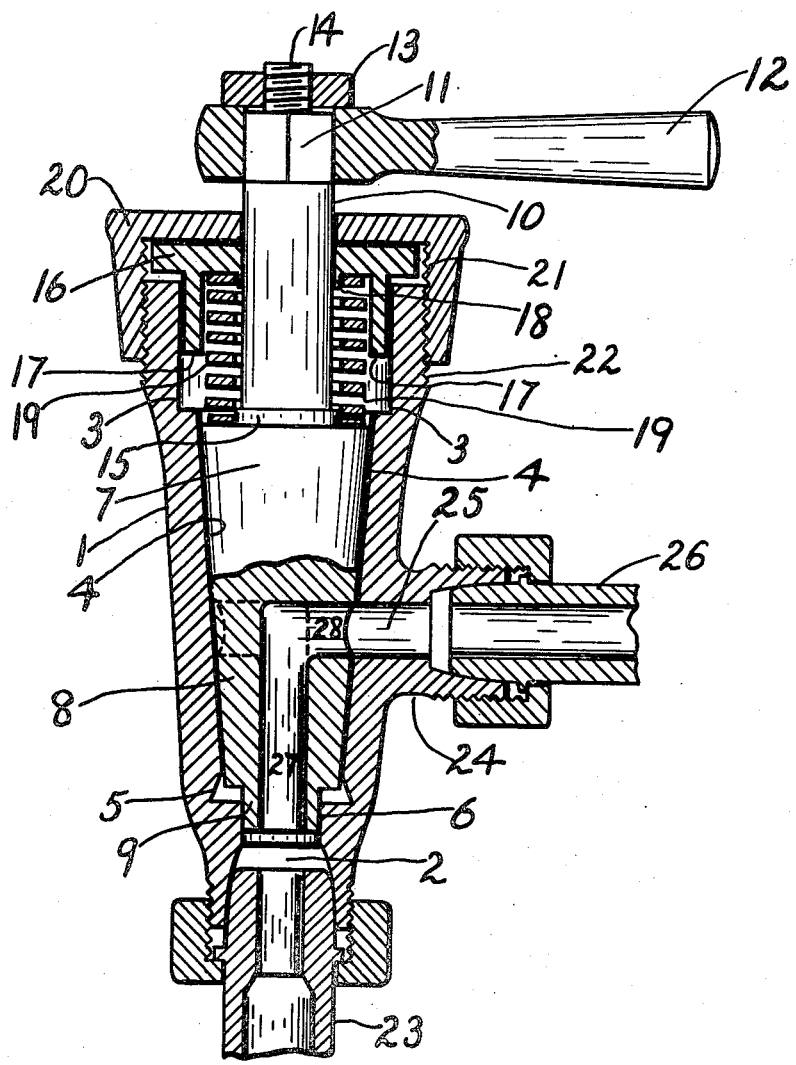
INVENTOR
FRANK. H. WILLIS
By Fetherstonhaugh & Co
attys.

UNITED STATES PATENT OFFICE.

FRANK HARDY WILLIS, OF TORONTO, ONTARIO, CANADA, ASSIGNOR OF ONE-THIRD TO WILLIAM ARTHUR DOWDELL AND ONE-THIRD TO CHARLES HERBERT JACKSON, BOTH OF TORONTO, ONTARIO, CANADA.

VALVE.

1,377,240.      Specification of Letters Patent.      Patented May 10, 1921.

Application filed June 28, 1920. Serial No. 392,218.

*To all whom it may concern:*

Be it known that I, FRANK HARDY WILLIS, a subject of the King of Great Britain, and a resident of the city of Toronto, in the county of York, Province of Ontario, Dominion of Canada, have invented certain new and useful Improvements in Valves, of which the following is the specification.

My invention relates to improvements in valves and the object of the invention is to devise a valve in which the liability of leakage is minimized; a further object is to devise a valve which will be durable and which will be maintained in good operative condition by continued use; a further object is to render the valve interior mechanism entirely dust proof; and a still further object is to so design the valve that the danger of grit or foreign abrasive matter, being carried into the valve with the liquid passing therethrough and damaging the valve surfaces and causing leakage is minimized.

My invention consists of an outer casing having a central passage extending axially therethrough, part of said passage constituting a conical valve seating, a conical valve plug engaging said valve seating, axially extending shanks on the plug journaled in the casing, a compression spring engaging the top of the valve plug and the top of the casing and forcing the plug against its seating, a fluid passageway extending axially and upwardly from the bottom of the casing and valve plug and turned at right angles within the plug and communicating with an outlet passageway in the casing, all as more particularly described and illustrated in the accompanying drawing which represents a central vertical section through a valve constructed according to my invention showing the parts of the valve in the open position.

In the drawing, 1 is the outer casing of my valve which has a central passage 2 extending longitudinally therethrough.

3 is a cylindrical upper portion of this passage.

4 is a tapered portion of the passageway which constitutes a conical valve seating. The valve seating 4 terminates at its bottom end in an outwardly inclined portion 5.

6 is a cylindrical portion of the passageway 2.

7 is a valve plug having the tapered conical portion 8 which engages the valve seating 4.

9 is an axial shank portion extending from the lower end of the plug 7 and which is journaled in the cylindrical portion 6 which forms a bearing therefor.

10 is an upwardly extending axial shank carried by the plug 7 and having the squared portion 11 for the reception of the operating lever 12.

13 is a nut which engages the upper threaded end 14 of the shank 10 and serves to retain the lever 12 in position.

15 is a concentric shoulder on the shank 10.

16 is an internal bonnet having a concentric central orifice through which the shank 10 extends and the depending annular flange 17 which engages the cylindrical upper portion 3 of the passage 2 in the casing 1.

18 is a depending concentric annular flange carried by the under face of the bonnet 16 for a purpose as will appear hereinafter.

19 is a compression spring.

20 is a cap having a concentric central orifice through which the shank 10 extends and having the internally threaded portion 21 which engages the externally threaded portion 22 at the upper end of the casing 1.

The lower end of the casing 1 is designed to receive the inlet pipe 23 in the usual manner.

24 is a branch carried at the side of the casing and having the central passageway 25 communicating with the interior of the valve casing. This branch is threaded and designed to receive the outlet pipe 26 in the usual manner.

27 is an axial passageway extending upwardly from the lower end of the valve plug 7.

28 is a passageway extending at right angles from the upper end of the passageway 27 and communicating with the passageway 25.

The construction and operation of my valve is as follows:

The valve plug 7 is inserted into the casing 1 so that the conical portion thereof engages the seating 4.

It is to be noted that the upper end of the conical plug 7 is below the upper end of the conical seating 4 and that the lower end of the conical plug extends below the lower end of the conical seating. The purpose of this construction will be explained hereinafter.

The lower shank 9 of the valve plug 7 engages the portion 6 of the casing, which forms a journal bearing for the lower end of the valve plug.

The compression spring 19 is now placed over the upper shank 10 followed by the bonnet 16 and the screw cap 20.

The depending annular flange of the bonnet 16 is in snug engagement in the orifice 3.

The screw cap 20 is now screwed onto the top of the casing 1 and this forces the bonnet 16 down, which in turn compresses the spring 19 thus forcing the valve plug 7 against its seating.

The shoulder 15 on the shank 10 and the flange 18 on the bonnet 16 engage the spring 19 and maintain it centrally located so that the pressure exerted by the spring upon the valve plug is truly axial.

It will be noted that the orifices in the cap 20 and bonnet 16 through which the shank 10 extends form a journal bearing for the upper end of the valve plug.

Heretofore valves of this type have not proved altogether satisfactory for use with light fluids, such as gasolene, owing to their tendency to leak after being in use some time.

This tendency to develop leaks has been due to a number of causes some of which are as follows:

(a) The side thrust of the valve plug caused by the operation of the valve has caused uneven wear which has destroyed the proper seating of the valve and resulted in leakage.

(b) Ridges become formed in the seating and valve plug after continued use and thus render the proper seating of the valve impossible.

(c) Foreign abrasive matter and grit is carried into the valve by the liquid passing therethrough and scores the valve plug and seating.

(d) The valve plug and seating have been made of material of equal hardness so that both are subject to wear.

(e) The spring has been placed at the small end of the valve plug in which position its effect is not as efficient as when placed at the large end. The pressure is not as equally distributed over the valve surface and it is more difficult to render its action truly axial on the valve plug.

(f) The interior mechanism of the valve has not been rendered sufficiently dust proof.

It has been in an endeavor to overcome the defects of former valves of this type that I have devised my valve and I have successfully eliminated the defects referred to above as follows:

(a) All side thrust is eliminated in my valve as both ends of the valve plug are journaled in the valve casing and thus there is no possibility of any side thrust being exerted by the valve plug upon the seat when the valve is operated.

(b) There is no tendency to form ridges which will prevent the proper seating of the plug since the top of the conical plug is below the top of its seating and the bottom of the conical plug extends below its seating. The outwardly inclined portion 5 is provided to accomplish this last feature. It will be noted that sufficient clearance is left below the plug to allow the descent of same, as it wears with use.

(c) By having the inlet at the bottom of this valve and the outlet at the side, there is very little chance of foreign abrasive matter or grit being carried by the liquid through the valve and scoring the valve surface as would be the case if a simple transverse passage through the valve were used, with the inlet and outlet at opposite sides of the valve, as with my construction the heavy foreign matter will tend to fall away from, rather than rise up into the valve. Further by this construction a larger valve seating area is obtained than would otherwise be the case, which feature is important when dealing with light liquids such as gasolene. Further in my construction when in the "shut off" position, the openings in the valve plug and seating are 180° apart whereas with the transverse passage they are only 90° apart. The "shut off" position is indicated in dotted lines in the drawing.

(d) In the construction of my valve the seating 4 is made of harder material than the valve plug 7 so that any wear which occurs will all be upon the valve plug. In this way the casing 1 with its conical valve seating 4 will remain indefinitely in exactly the condition in which it leaves the factory and continued use of the valve will simply wear the valve plug into perfect conformity with its seating, with the result that the valve will at all times remain tight and free from leakage.

(e) By placing the spring at the large end of my valve plug I am able to use a spring of greater size thereby being able to use one of weaker compression and consequently increasing the life thereof. Further by means of the shoulder 15 and flange 18 I maintain the spring absolutely central and thus insure its pressure being exerted truly axially on the valve plug. I am aware that springs have been used with valves of this type but I am not aware that the spring has ever been placed at the large end of the valve plug.

(f) My construction renders the interior parts of the valve absolutely dust proof.

I prefer to make my valve seating and valve plug of gun metal using a metal of greater hardness for the seating than for the plug.

It will readily be seen that my valve will be entirely self grinding since continued operation will tend to grind the plug into perfect engagement with its seat. In this way the manufacturing cost will be reduced as less expert workmanship will be required in making, since any imperfection which might exist when the valve is first put into use will soon disappear with use as the valve plug wears into perfect fit on its seating. This will practically eliminate all maintenance cost as it will do away with the necessity of periodically grinding in the valve and also of the replacement of parts.

Many modifications may be made in my invention without departing from the spirit of the same or the scope of the claims and the form shown is to be taken as illustrative and not in a limiting sense.

For instance while I have described my valve with particular reference to its use for gasolene and similar light liquids, it could also be used for steam lines in which case certain obvious changes would have to be made in the way of stuffing boxes at the inlet and outlet and also where the spindle 10 passes through the top of the valve, but my peculiar construction of the valve plug and seating, constituting the valve engaging surfaces and the novel method of mounting the spring would be applicable.

Also while I have described particularly a valve having the inlet at the bottom with a right angle passageway through the valve plug and while I consider this the preferred and superior construction it is to be understood that valuable features of my invention are applicable to a valve with inlet and outlet at opposite sides of the casing and having a transverse passageway through the valve plug. Further while I have shown a hand lever for operating the valve, various other methods might be used such as a hand wheel.

From the foregoing it will be seen that I have devised valuable improvements in valves which will greatly increase their efficiency.

What I claim as my invention is:

1. In a valve, the combination with the casing having inlet and outlet orifices and a longitudinally disposed orifice within the casing, the upper portion of which is cylindrical and the lower portion of which constitutes a conical valve seat, of a conical valve plug rotatably engaging the conical valve seat, a journal pin extending axially from the lower end of the valve plug and journaled in the casing, an axial spindle extending upwardly from the upper end of the valve plug, a bonnet having a depending annular flange engaging the aforesaid upper cylindrical portion of the orifice in the casing, a compression spring surrounding the upwardly extending spindle of the valve plug, the ends of said spring engaging respectively the top of the conical valve plug and the under face of the bonnet, a screw cap engaging the upper end of the casing for forcing the bonnet downwardly and compressing the spring, the bonnet and cap each having a central orifice therein through which the upwardly extending spindle of the valve plug extends, said orifice forming a journal bearing for said spindle, the valve plug having a passageway therein adapted to register with the inlet and outlet orifices in the casing, and an operating handle carried by the upper end of the upwardly extending spindle for rotating the valve plug.

2. In a valve, the combination with the casing having inlet and outlet orifices and a longitudinally disposed orifice within the casing, the upper portion of which is cylindrical and the lower portion of which constitutes a conical valve seat, of a conical valve plug rotatably engaging the conical valve seat, an axial spindle extending upwardly from the upper end of the conical valve plug, a bonnet having a depending annular flange engaging the aforesaid upper cylindrical portion of the orifice in the casing, a compression spring surrounding the said spindle and interposed between the valve plug and the bonnet, a screw cap engaging the upper end of the casing for forcing the bonnet downwardly and compressing the spring, the bonnet and screw cap having central orifices therein through which the spindle extends, said orifices forming a journal bearing for said spindle, a concentric shoulder on the spindle and a depending concentric annular flange on the under face of the bonnet which engage respectively the two ends of the compression spring to maintain said spring centrally located, the valve plug having a passageway therein adapted to register with the inlet and outlet orifices in the casing and an operating handle carried by the upper end of the upwardly extending spindle for rotating the valve plug.

FRANK HARDY WILLIS.

Witnesses:
JOHN G. HAYWARD,
NORIEEN COLES.